US010705734B2

(12) United States Patent
Natvig

(10) Patent No.: US 10,705,734 B2
(45) Date of Patent: *Jul. 7, 2020

(54) EXPANDING VARIABLE SUB-COLUMN WIDTHS AS NEEDED TO STORE DATA IN MEMORY

(71) Applicant: Medallia, Inc., San Mateo, CA (US)

(72) Inventor: Thorvald Natvig, Palo Alto, CA (US)

(73) Assignee: MEDALLIA, INC., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/242,867

(22) Filed: Jan. 8, 2019

(65) Prior Publication Data

US 2019/0146680 A1 May 16, 2019

Related U.S. Application Data

(63) Continuation of application No. 15/672,078, filed on Aug. 8, 2017, now Pat. No. 10,228,857, which is a continuation of application No. 14/681,478, filed on Apr. 8, 2015, now Pat. No. 9,766,808.

(60) Provisional application No. 62/082,558, filed on Nov. 20, 2014.

(51) Int. Cl.
*G06F 12/00* (2006.01)
*G06F 3/06* (2006.01)
*G06F 12/04* (2006.01)

(52) U.S. Cl.
CPC ............ *G06F 3/0608* (2013.01); *G06F 12/04* (2013.01); *G06F 2212/1016* (2013.01); *G06F 2212/1044* (2013.01); *G06F 2212/163* (2013.01)

(58) Field of Classification Search
CPC .................. G06F 3/0608; G06F 12/04; G06F 2212/1016; G06F 2212/1044; G06F 2212/163
See application file for complete search history.

(56) References Cited

U.S. PATENT DOCUMENTS 7,765,378 B1 * 7/2010 Georgiev .............. G06F 3/0608 711/173
2002/0069226 A1 6/2002 Thierschmidt
2013/0073830 A1 3/2013 Gandhi
2014/0059085 A1 2/2014 Schreck

* cited by examiner

*Primary Examiner* — Arvind Talukdar
(74) *Attorney, Agent, or Firm* — Van Court & Aldridge LLP

(57) ABSTRACT

A set of data storage values is received. It is determined that a data storage value in the set will not fit in an available memory segment including variable data column widths based at least in part on data sizes specified in a plurality of segment layout maps. A memory segment is selected for which a column width of a column will be expanded. A column width of the selected memory segment is expanded. A segment layout map corresponding to the selected memory segment is updated. The set of data storage values is stored in the selected memory segment.

20 Claims, 13 Drawing Sheets

TYPICAL MEMORY SEGMENT

600

| Field ID (610) | Column (620) | Offset (630) | Mask (640) |
|---|---|---|---|
| 1 | 0 | 26 | 0x3F |
| 2 | 0 | 19 | 0x7F |
| 3 | 0 | 0 | 0x7FFFF |
| 4 | 1 | 17 | 0x7F |
| 5 | 1 | 0 | 0x1FFFF |
| ... | ... | ... | ... |
| X | N | 0 | 0xFF |

650 data[column[Field_ID]] [row] >> offset[Field_ID] & mask[Field_ID]

| e-zip (1110) | | e-status (1120) | | k-days (1130) | |
|---|---|---|---|---|---|
| Value | Mask | Value | Mask | Value | Mask |
| 9 | 4 | 0 | 0 | 1000 | 11 |
| 1 | 2 | 0 | 0 | 1 | 1 |
| 7 | 3 | 11 | 4 | 2 | 2 |
| 6 | 3 | 7 | 3 | 1 | 1 |
| 50 | 6 | 3 | 2 | 3 | 2 |

| e-zip (1152) | | e-status (1154) | | k-days (1156) | |
|---|---|---|---|---|---|
| Value | Mask | Value | Mask | Value | Mask |
| 50 | 6 | 3 | 2 | 3 | 2 |
| 9 | 4 | 0 | 0 | 1000 | 11 |

1160

| e-zip (1162) | | e-status (1164) | | k-days (1166) | |
|---|---|---|---|---|---|
| Value | Mask | Value | Mask | Value | Mask |
| 7 | 3 | 11 | 4 | 2 | 2 |
| 6 | 3 | 7 | 3 | 1 | 1 |
| 1 | 2 | 0 | 0 | 1 | 1 |

FIG. 11B

EXPANDING VARIABLE SUB-COLUMN WIDTHS AS NEEDED TO STORE DATA IN MEMORY

CROSS REFERENCE TO OTHER APPLICATIONS

This application is a continuation of co-pending U.S. patent application Ser. No. 15/672,078, entitled EXPANDING VARIABLE SUB-COLUMN WIDTHS AS NEEDED TO STORE DATA IN MEMORY filed Aug. 8, 2017, which is a continuation of U.S. patent application Ser. No. 14/681,478, now U.S. Pat. No. 9,766,808, entitled EXPANDING VARIABLE SUB-COLUMN WIDTHS AS NEEDED TO STORE DATA IN MEMORY filed Apr. 8, 2015, which claims priority to U.S. Provisional Patent Application No. 62/082,558, entitled STORING DATA VALUES filed Nov. 20, 2014, all of which are incorporated herein by reference for all purposes.

BACKGROUND OF THE INVENTION

Existing memory systems tend to store data values in a way that uses more space than is necessary, especially when memory is allocated statically. In current systems, memory size is allocated for the largest possible value of a given data item. It would be useful if a scheme for storing data values could be developed that would make more efficient use of available memory.

BRIEF DESCRIPTION OF THE DRAWINGS

Various embodiments of the invention are disclosed in the following detailed description and the accompanying drawings.

FIG. 6 is a diagram illustrating embodiments of a memory segment layout map.

FIG. 11A is a table illustrating embodiments of splitting memory segments.

FIG. 11B is a table illustrating embodiments of splitting memory segments.

DETAILED DESCRIPTION

Figure 1:
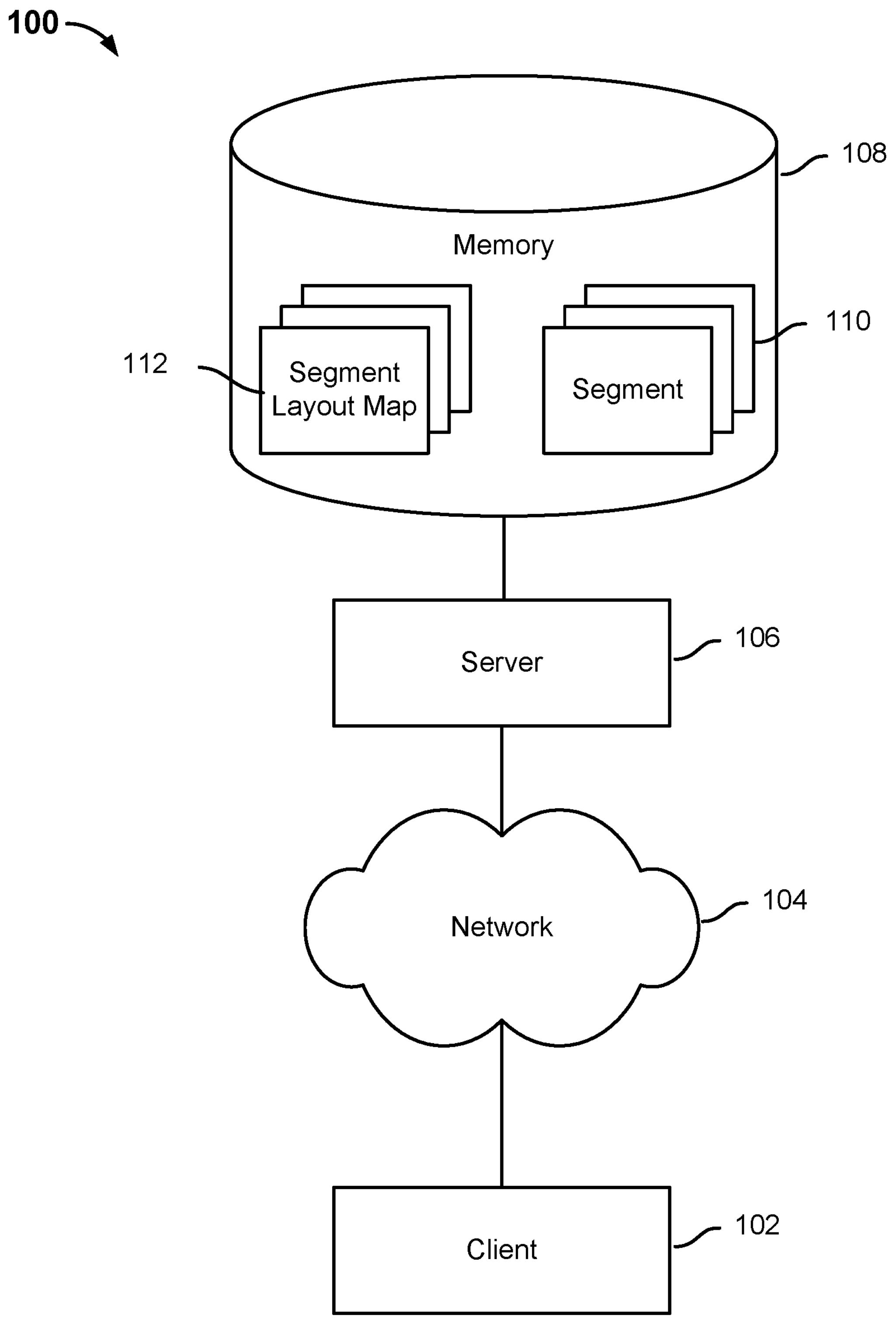
FIG. 1 is a block diagram illustrating embodiments of a system to reduce memory usage in storing data values.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Reducing memory usage in storing data values is disclosed. In various embodiments, a memory structure includes one or more memory segments. The memory segments each include vectors of data storage values. A set of data storage values is stored in one or more vectors occupying a row of the memory segment. The vectors in a row are arranged into columns. The columns are multiplexed to include multiple sub-columns. In traditional memory storage systems, memory segments include columns and/or sub-columns of fixed width. Typically, the width of a column is determined upon generation of the memory segment.

Memory segments disclosed herein in various embodiments include columns and/or sub-columns of variable size. The width of columns and/or sub-columns may be expanded or contracted. For example, as data values are added to the memory segment, columns and/or sub-columns are expanded (if necessary) to accommodate the size of the added data storage values. Because the column widths in a memory segment are variable, the memory segment need not be generated with columns and/or sub-columns large enough to store any possible data storage value. Rather, the memory segment may grow in capacity as larger data values are added to the segment. A memory segment according to various embodiments is therefore to be generated with minimal capacity and is expanded by only the amount necessary to accommodate the size of data storage values sought to be stored in the segment. Using the techniques disclosed herein, the density of data storage is increased relative to a typical memory segment. And as a result, the cost of memory storage is reduced and the efficiency of the memory increased relative to a memory system including typical memory segments.

According to some embodiments, a segment layout map includes information used to locate data storage values in a memory segment. The segment layout map is to be updated as the locations of data values change over time. Locations of data values may change as a result of, for example, column width expansion, data value rearrangement, and/or other operations.

In various embodiments, a set of data storage values is received. It is determined that a data storage value in the set will not fit in an available memory segment including variable data column widths based at least in part on data sizes specified in a plurality of segment layout maps. A memory segment is selected for which a column width of a column will be expanded. A column width of the selected memory segment is expanded. A segment layout map corresponding to the selected memory segment is updated. The set of data storage values is stored in the selected memory segment.

FIG. 1 is a block diagram illustrating embodiments of a system to reduce memory usage in storing data values. In the example shown, a data storage system 100 includes a client device 102, a network 104, a server 106, and/or memory 108. The client device 102 may include, for example, a personal computer, laptop, mobile device, a server, and/or any other type of computing device. The client device 102 provides data to and/or receives data from the server 106 and/or memory 108 via a network 104. The network 104 may include, for example, a high speed data network, telecommunications network, and/or any other type of network. The server 106 communicates with the memory 108 to store data in the memory 108 and/or retrieve data from memory 108.

In various embodiments, the memory 108 includes one or more memory segments 110. A memory segment 110 may include vectors of integers, arrays, and/or other data structures arranged into columns of variable width. The columns may include sub-columns of variable width. And each column and/or sub-column may be associated with a type of data. Vectors including one or more fields of data may occupy rows in a column of the memory segment 110. A vector of storage data values may include data corresponding to one or more data fields, and each field may occupy a range of elements in the vector. The range of elements may correspond to the width of a column and/or a sub-column within the column.

In various embodiments, memory segments 110 are associated with segment layout maps 112. For example, each of one or more memory segments 110 is associated with a memory segment layout map 112. In various embodiments, a segment layout map 112 includes a data structure separate from a memory segment 110 to which the segment layout map 112 corresponds. In some embodiments, a segment layout map 112 includes an array, table, matrix, and/or other data structure including index information associated with various data fields of a segment 110. In one example, a segment layout map 112 includes data field identifiers and corresponding column identifiers, offset values, mask values, and/or other information. For example, the segment layout map 112 may include vectors including field identifiers, column identifiers, offset values, mask sizes, and/or other information. In some embodiments, a segment layout map 112 is included in a memory segment 110 to which the segment layout map 112 corresponds.

According to various embodiments, a server 106 receives data storage values from a client 102, and the data storage values are stored in memory segments 110 included in the memory 108. Data storage values may include any type of data. For example, in a database storing survey data, data storage values may include user age, income, zip code, phone number, survey answers, survey status indicating whether the user has completed the survey, a time the user takes to answer the survey, and/or any other data. Each of these categories of data storage values may be associated with a field identifier that denotes a type of field associated with the category. The field identifier includes a value that maps to a type of data field. In some embodiments, when a data storage value is received, the server 106 determines a storage location for the data storage value. For example, the server 106 determines a memory segment 110 in which the data value is to be stored. To select a memory segment 110 in which to store the value, the server 106 determines a field identifier associated with the data storage value and/or a size associated with the data storage value. The field identifier is used to look up columns and/or sub-columns including data of a type associated with the data storage value. The data storage value size is compared to mask size and/or other column size information for each of the columns and/or sub-columns. In various embodiments, a "mask" with respect to a column or a sub-column refers to the maximum storage size (e.g., in bits) associated with that column or sub-column. In some cases, a memory segment 110 is selected that includes a column and/or sub-column large enough to accommodate the data storage value without expansion. A column and/or sub-column large enough to accommodate the data storage value may include a column that includes enough bits to store the value. A column and/or sub-column, in some embodiments, includes enough bits to store the data value if a mask associated with the column and/or sub-column includes at least as many bits as the data storage value. When a segment is identified that includes a column and/or sub-column large enough to accommodate the data storage values, the values are added to the segment. For example, one or more vectors including the data storage values are added to the segment as a row.

In some embodiments, it is determined that a data storage value in a set of values will not fit in any available memory segments 110. For example, it may be determined that the size of the data storage value is greater than any of the columns and/or sub-columns in any of the segments 110 in a memory 108. In this case, a memory segment 110 is selected, and a column and/or sub-column width of the memory segment 110 is expanded to accommodate the data storage value. The column width is expanded by increasing the number of bits stored in the column. In one example, a memory segment 110 that would require the least column and/or sub-column width expansion is selected, and the column and/or sub-column width of the selected memory segment 110 is expanded. In some embodiments, expanding a column and/or sub-column may include increasing a size of a mask associated with the column and/or sub-column.

In some embodiments, a segment layout map 112 is used to locate data storage values in a memory segment. Data included in a segment layout map 112 may be used to generate a pointer to a data storage value in a memory segment 110 corresponding to the segment layout map 112. In some cases, a query is generated by looking up information included in a segment layout map 112. In one example, server 106 may receive a request to retrieve data storage values including a zip code for a specific individual John Smith. The request may include information identifying the data field "zip code" and information identifying the individual John Smith. The server 106 may generate a query to retrieve the data storage values including John Smith's zip code from a segment 110 in which the values are stored. The server 106 may, for example, identify a segment 110 in which the data values associated with the user John Smith are stored and/or determine a field identifier associated with the data field "zip code." The field identifier may be used to look up a column index, offset value, mask value, and/or other information used to locate the zip code data storage value in the segment 110. A query is generated including the column index, row index associated with John Smith, the offset value, the mask value, and/or other information. The query is executed to retrieve John Smith's zip code from the memory segment 110.

Figure 2:
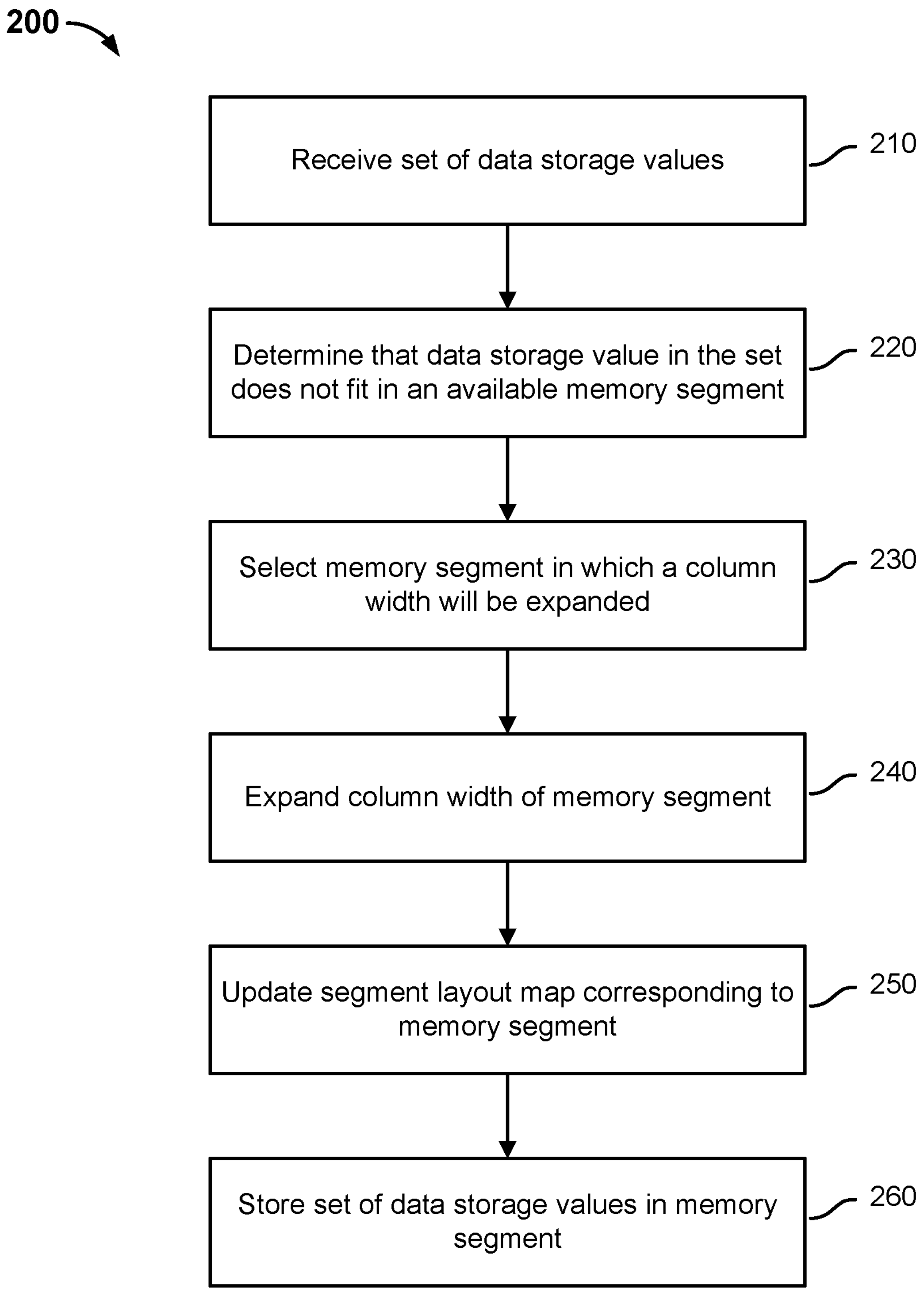
FIG. 2 is a flowchart illustrating embodiments of a process of storing data values.

FIG. 2 is a flowchart illustrating embodiments of a process of storing data values. In various embodiments, the process 200 is performed at server 106 of FIG. 1. The techniques disclosed herein in various embodiments are described in the context of examples related to storing, retrieving, and/or otherwise processing data associated with individuals and/or user profiles. The techniques disclosed herein are, however, not limited to this context and are broadly applicable to all types of data as used in a wide variety of contexts.

At 210, a set of data storage values is received. The set of data storage values may be received at, for example, a server, client, and/or another node. A set of data storage values includes one or more data storage values. A data storage value may include any type of data. For example, a data storage value may include binary values, numbers, strings, and/or any other type of data value. In some embodiments, data storage values are processed to convert the values to a proper format for storage. For example, a base-10 integer may be converted to a binary integer, a string may be converted to one or more binary integers, and/or other data processing operations may be performed.

In one example, a set of data storage values includes data storage values associated with an individual. Data storage values associated with an individual may include, for example, the person's name, address, zip code, phone number, income, survey answers, number of days since an event, and/or any other data associated with the individual. A set of data storage values may include one or more data storage values received from a client device. Upon receipt, the set of data storage values is processed for storage in memory.

At 220, it is determined that a data storage value in the set does not fit in an available memory segment including variable column widths. In various embodiments, a determination that the data storage value does not fit is made based at least in part on data sizes specified in a plurality of segment layout maps.

In some embodiments, a data storage value in a set of data storage values is compared to column size information specified in a segment layout map associated with a memory segment to determine whether columns in a memory segment can accommodate the data storage value without expansion. For example, a size of a data storage value is determined, and the size is compared to column size information included in the segment layout map. The size of a data storage value may include a number of bits, bytes, and/or other amount of storage necessary to store the data storage value. A number of bits, bytes, and/or other units of information that a column and/or sub-column can accommodate may be determined based on a mask associated with the column and/or sub-column. To compare the data storage value to an appropriate column in a memory segment, a field identifier associated with the data storage value is determined. The field identifier is used to look up in a segment layout map column(s) and/or sub-column(s) in a memory segment that store data associated with the field identifier. The data storage value is compared to the column(s) and/or sub-column(s) to determine whether the column(s) and/or sub-column(s) are large enough to accommodate the data storage value. In some cases, a field identifier is used to look up a mask size associated with the column(s) and/or sub-column(s). In the event that the mask size and/or column size is greater than or equal to the number of bits associated with the data storage value, it may be determined that the data storage value can be stored in the memory segment. In the event that the mask size and/or column size is less than the number of bits associated with the data storage value, it may be determined that the data storage value cannot be stored in the memory segment without column width expansion.

In various embodiments, this process is repeated for all memory segments of a memory. For example, a data storage value is compared to column width information included in multiple segment layout maps each associated with one of multiple available memory segments. In some cases, it is determined that no available memory segment includes a column storing data of the same type as the data storage value that is large enough to accommodate the data storage value.

By way of example, a data storage value including a user's age—85 years old—requires a column and/or sub-column width of seven (7) bits to store the binary number $1010101_2$. In this case, segment layout maps associated with each of the available memory segments in a memory are queried to determine whether a memory segment includes a user age field with a column width of at least seven (7) bits. Based on the query of the segment layout maps, it may be determined that the data storage value including the user's age—$1010101_2$—will not fit in any available memory segment. In this case, it is determined that no memory segment includes a user age column and/or sub-column including seven (7) or more bits.

At 230, a memory segment for which a column width will be expanded is selected. In various embodiments, a memory segment is selected from a plurality of memory segments. The selected memory segment includes, for example, a memory segment with a column and/or sub-column including data of the type associated with the data storage value. In one example, a data storage value includes a user's age, and in this case, a memory segment including at least a column and/or sub-column storing user age data values is selected. In various embodiments, the set of data storage values includes multiple data storage values, and each of the data storage values is associated with a data field type as denoted by a field identifier.

In some cases, a memory segment is selected that includes columns and/or sub-columns associated with each of the data field types included in a set of data storage values.

In some embodiments, a memory segment that would require a least expansion is selected. For example, a data storage value including a user's yearly income of $50,000 requires 16 bits of storage. A first memory segment includes a yearly income sub-column with a 10-bit mask indicating, for example, that the sub-column can store values up to 10 bits. A second memory segment includes a yearly income column with a 14-bit mask. And a third memory segment includes a yearly income column with an 8-bit mask. In this case, the second memory segment is selected as it would require an expansion of two (2) bits to accommodate the data storage value—the user's yearly income of $50,000 occupying 16 bits of storage. The two (2) bit expansion is the least expansion of the three memory segments because the first memory segment would require a column expansion of six (6) bits and the third memory segment would require a column expansion of eight (8) bits to store the 16-bit data storage value.

At 240, a column width of the memory segment is expanded. In various embodiments, the column width of the selected memory segment is expanded by increasing the column width to accommodate the additional bits necessary to store the data storage value. A column may include one or more rows of vectors each of which may be expandable to store up to 32 bits and/or another amount of information. A column may include one or more sub-columns. A vector occupies an entire width of a column while various ranges of elements within the vector occupy sub-columns of the column. In some cases, an entire column is associated with a data field corresponding to a field identifier. Each of the vectors included in that column includes data storage values associated with the data field. Continuing with the example above, the selected column includes 14 bits and the column stores user income data. To store the 16-bit data storage value, the user's income of $50,000, the column is expanded by two (2) bits.

In some embodiments, a column includes multiple sub-columns, and each sub-column is associated with a data field. In this case, the size of the selected memory segment is expanded by increasing a width of a sub-column and, possibly as a result, a column including the sub-column. In one example, a column is 28 bits wide and includes rows of vectors including 28 elements. The vectors including 28 elements are configured to store 28 bits of information. The column includes three (3) sub-columns. A first sub-column occupies elements 0-6 of the column, a second sub-column occupies elements 7-20, and a third sub-column occupies elements 21-27. The memory segment including the column stores survey-related data. The first sub-column includes data values indicating days since a user's last login, the second sub-column includes data values indicating user income, and the third sub-column includes user age data. Returning to the example above, in order to accommodate the 16-bit data storage value including a user's income of $50,000, the second sub-column is expanded from 14 bits occupying elements 7-20 to 16 bits. When expanded to 16 bits, the second sub-column occupies elements 7-22 of the column, the third sub-column is shifted to occupy elements 23-29, and the column is expanded to include 30 bits.

In various embodiments, a mask associated with the expanded column and/or sub-column is updated. A mask is updated to match the number of elements in an expanded column and/or sub-column. Continuing with the example, the second sub-column width is increased from 14 bits to 16 bits. Prior to expansion, the mask for the sub-column included a 14-bit mask, and after expansion of the sub-column includes a 16-bit mask.

In various embodiments, expansion of a sub-column results in a column exceeding a maximum allowable column width. In some embodiments, the maximum allowable column width may include 32 bits. In some embodiments, the maximum allowable column width may be a number of bits other than 32 bits, such as, for example, 64 bits. In some embodiments, the maximum allowable column width may be any predetermined number of bits. In this case, the expanded sub-column is moved to another column (if available) in the memory segment. For example, all values included in the vectors stored in the expanded sub-column are moved to another column that has the capacity to store the expanded sub-column.

At 250, a segment layout map corresponding to the memory segment is updated. In various embodiments, a segment layout map corresponding to a memory segment is updated based on the column width expansion. A segment layout map may include a data structure comprising field identifiers, column identifiers, offset values, mask values, and/or other information used to determine memory storage locations of data storage values. A field identifier may be associated with data field type. The segment layout map may map field identifiers to corresponding column identifiers, offset values, and mask sizes. A column identifier includes an index to a certain column with a memory segment. A row identifier and a column identifier point to a vector within a memory segment. An offset value and mask value are used to extract a data storage value from the vector. The offset value indicates, for example, a number of elements by which to right-shift the vector. The mask includes a value to be combined with the right-shifted vector in order to extract the desired data storage value. The process of retrieving data storage values from a memory segment is discussed in further detail below.

In various embodiments, column-width expansion causes the location of data storage values in a memory segment to change. A segment layout map corresponding to the memory segment is updated to reflect the changes. Continuing with the sub-column expansion example above, the first sub-column is associated with a field identifier 0, the second sub-column is associated with a field identifier 1, and the third sub-column is associated with a field identifier 2. As discussed above, the second sub-column is expanded from occupying elements 7-20 to occupying elements 7-22 and the third column is shifted from occupying elements 21-27 to occupying elements 23-29. In this case, a segment layout map is updated by increasing a mask value associated with the field identifier 1 from 14 bits (0xFFF) to 16 bits (0xFFFF). The segment layout map is also updated by increasing the offset value associated with field identifier 2, which corresponds to the third sub-column, from 21 to 23.

At 260, the set of data storage values is stored in the memory segment. In various embodiments, the set of data storage values is stored in the memory segment by adding the data storage values to one or more vectors and adding the vectors as rows in the memory segment. For example, the data storage value that a column and/or sub-column was expanded to accommodate is stored in the expanded column and/or sub-column. Other data storage values in the set are stored in the other columns and/or sub-columns of the memory segment. In some cases, the memory segment selected for column width expansion includes columns and/or sub-columns corresponding to each of the one or more data field types associated with the data storage values. In this case, each of the data storage values is stored in an appropriate column and/or sub-column corresponding to the field identifier of the data storage value. To store data storage values in appropriate columns, the data storage values are arranged into vectors and the vectors added to a row of the memory segment. In one example, a set of data storage values for a user includes an age value of 24, an income value of $50,000, and a zip code value of 12345. Using the techniques disclosed herein, a user income sub-column of a selected memory segment is expanded to 16 bits to accommodate the received user income value $50,000. The user income value is stored in the expanded sub-column as the binary value $1100001101010000_2$ or hexadecimal value 0xC350. The user age value of 24 may be stored as the binary value $11000_2$ or hexadecimal value Ox18 in a sub-column associated with the user age field identifier. The zip code 12345 is stored as the binary value $11000000111001_2$ or hexadecimal value 0×3039 in a sub-column associated with the zip code field identifier.

In some embodiments, a set of data storage values includes data storage values associated with a person for which data is already stored in the memory segment. In this case, a column associated with the received data storage value is expanded using the techniques disclosed herein, and the data storage values are added to an existing row of the memory segment including data for that person. For example, the data storage values in the set may be added to existing vectors in the appropriate row, column, and/or sub-column locations.

Figure 3:
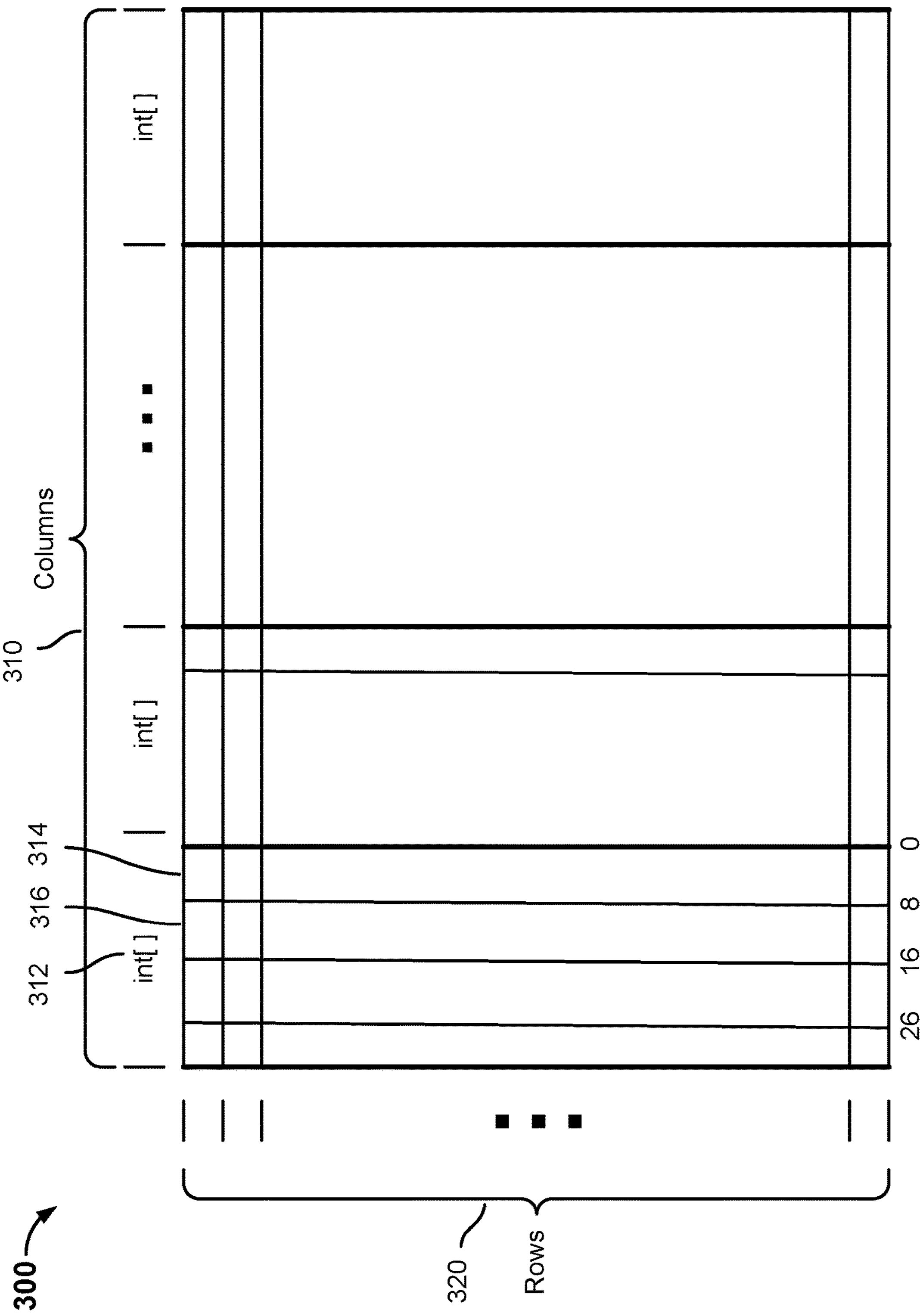
FIG. 3 is a diagram illustrating embodiments of a typical memory segment.

FIG. 3 is a diagram illustrating embodiments of a typical memory segment. In the example shown, a typical memory segment 300 includes columns 310 and sub-columns of fixed size. The columns 310 include one or more rows 320 of vectors. A first column 312 includes a fixed width including 32 bits of storage, and each row 320 in the first column includes a vector including 32 elements. The first column 312 includes four sub-columns, and the sub-columns are fixed in width. A first sub-column 314 includes a fixed width of eight (8) bits and occupies elements 0 thru 7 of the first column 312. A second sub-column 316 includes a fixed width of eight (8) bits occupying elements 8 thru 15 of the first column 312. Two additional sub-columns may occupy the remaining elements 16 to 25 and 26 to 31. In various embodiments, the size of the columns 310 and/or sub-columns are defined and/or fixed at the time the memory segment 300 is generated. For example, a user may define the column and/or sub-column sizes when the memory segment 300 is generated. Because the column and/or sub-column sizes cannot be expanded in the typical memory segment 300, a user may be inclined to conservatively overestimate the amount of storage allocated for certain data fields so that any foreseeable data storage values can be stored in the segment 300. By way of example, a column width is defined for a data field type that is difficult to predict including, for example, days between receipt of a survey and completion of the survey. In this case, most of the values will likely be in the range of 0 to 100 days. It would require a maximum seven (7) bits of storage to store each of the values in the range of 0 to 100. A user defining a column to store these values may, however, conservatively allocate enough storage space for values up to 1,000 days so that the memory segment 300 will be able to store any potential values without error. To store all values in the range of 0 to 1000, 17 bits may be allocated. Given that a vast majority, if not all, of the values received may fall within the 0 to 100 day range, allocating 10 extra bits—17 bits as opposed to seven (7) bits—of storage results in considerable underutilized and/or wasted space in the memory segment 300. Wasted and/or underutilized space increases the cost of memory as more segments will need to be generated and more storage space will need to be purchased. Generating more memory segments also reduces the speed of data storage and/or retrieval from the memory segments in memory.

Figure 4:
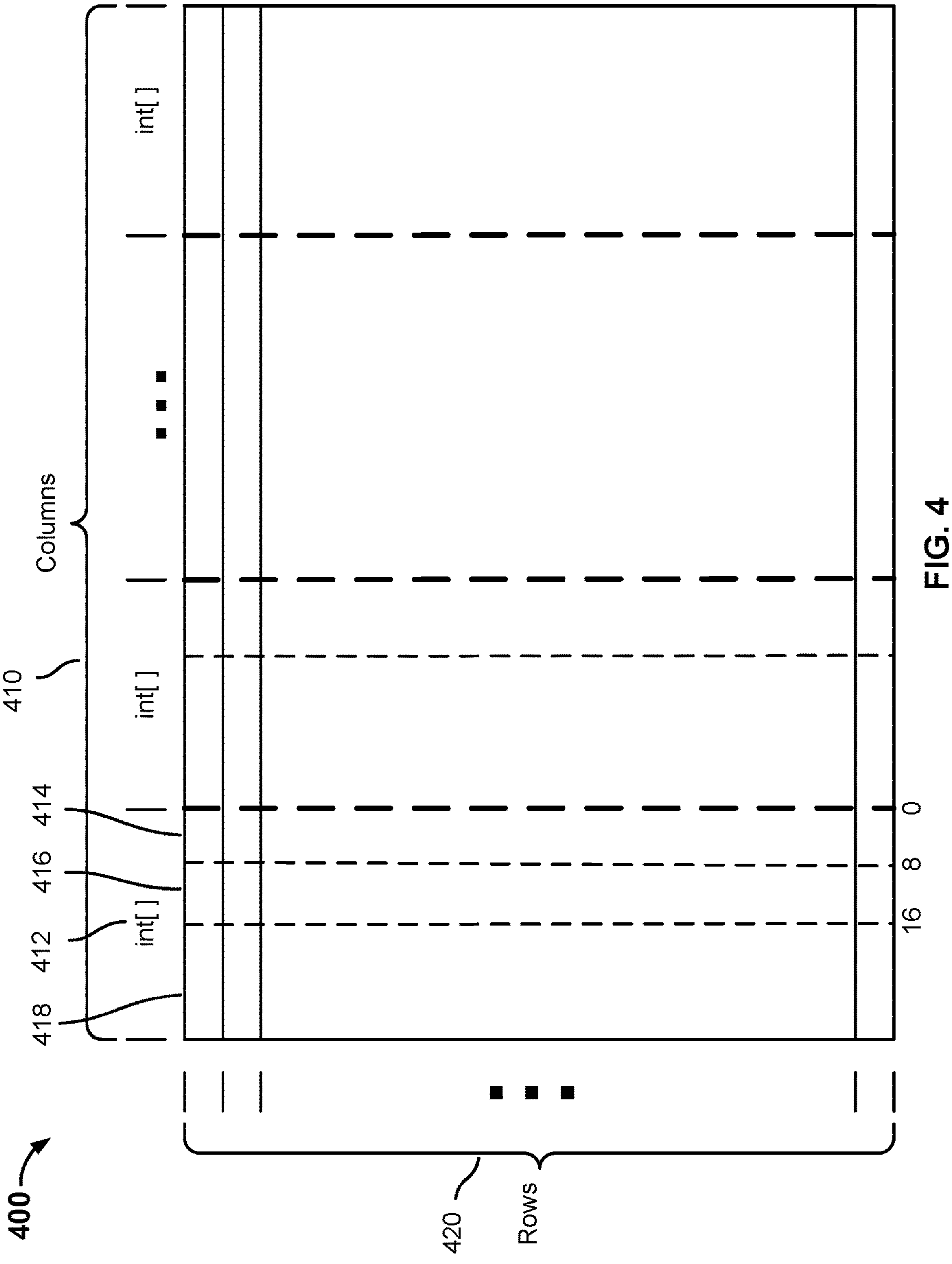
FIG. 4 is a diagram illustrating embodiments of a memory segment.

FIG. 4 is a diagram illustrating embodiments of a memory segment. In the example shown, a memory segment 400 includes columns 410 and/or sub-columns of variable width. The columns 410 include one or more rows 420 of vectors. Columns 410 may be multiplexed to include sub-columns. The columns 410 and/or sub-columns as depicted in FIG. 4 are shown with dashed lines to indicate that the widths of the columns and/or sub-columns are variable. For example, the columns 410 and/or sub-columns of memory segment 400 may be expanded as needed to accommodate new data storage values. In some embodiments, the columns 410 are fixed in width while the width of sub-columns included in a column are variable in width.

In various embodiments, a memory segment 400 is generated with no data. In this initial state (not shown), the columns 410 in memory segment 400 include zero (0) elements. In certain cases, each of the one or more columns 410 and/or sub-columns in memory segment 400 is associated with a data field type when the memory segment 400 is initialized. In other cases, columns 410 and/or sub-columns are assigned to data field types as data storage values are received and stored in the memory segment 400.

The memory segment 400 depicted in various embodiments in FIG. 4 includes an available memory segment at a time after initialization. In the example shown, a first column 412 includes a width of 28 bits. The first column 412 includes a storage column, and the storage column is multiplexed to include three sub-columns. Each of the three sub-columns is associated with a field identifier, and the field identifier denotes a data field type associated with the sub-column. A first sub-column 414 includes eight (8) bits occupying elements zero (0) thru seven (7) of the first column 412, and the first sub-column 414 is associated with a first data field—user age. A second sub-column 416 includes eight (8) bits occupying elements eight (8) thru 15 of the first column 412, and the second sub-column 416 is associated with a second data field—user rating of a restaurant on a scale of 0 to 100. A third sub-column 418 includes 12 bits occupying elements 16 thru 27 of the first column 412, and the third sub-column 418 is associated with a third data field—user income. In various embodiments, a set of data storage values including a user age value 30, a user's rating of a restaurant value of 78, and a user's income value $60,000 is received. Using the techniques disclosed herein in various embodiments, the memory segment 400 is selected for expansion. For example, it may be determined that field identifiers associated with the data storage values in the received set match field identifiers associated with columns and/or sub-columns of the memory segment 400. To accommodate the user income value of $60,000, the third sub-column 418 is expanded. For example, the third sub-column 418 is expanded from a capacity of 12 bits to 16 bits. To accommodate the third sub-column 418 expansion, the first column 412 is expanded from a capacity of 28 bits to a capacity of 32 bits. Once expanded, the third sub-column 418 occupies elements 16 thru 31 of the first column 412. The received set of data storage values is stored in the memory segment 400, and a segment layout map associated with the memory segment 400 is updated.

In various embodiments, expansion of a sub-column results in a column exceeding a maximum permissible column width. For example, a maximum allowable column width for a memory segment may include 32 bits or another value. In the case that expansion of the sub-column would exceed a max allowable column width, the expanded sub-column is moved to another column (if available) in the memory segment. For example, all values included in the vectors stored in the expanded sub-column are copied to a destination column, which has the capacity to store the expanded sub-column. In certain cases, a destination column is selected to minimize the amount of data moved within a memory segment. In one example, an optimal bit packing is calculated, and a destination column is selected based on the optimal bit packing so that moving the sub-column to the destination column uses the least amount of bits possible. In various embodiments, a copy and/or move command is generated, compiled, and/or executed to move the sub-column data to the destination column. By way of example, if a user income value of $100,000 is received, the third sub-column 418 would need to be expanded from a capacity of 12 bits to 17 bits and the first column 412 expanded from a capacity of 28 bits to 33 bits. In certain cases, this would exceed the 32-bit maximum capacity of the first column 412. The values stored in the third sub-column 418 are therefore transferred to another column that has the capacity to accommodate a 17 bit sub-column.

Figure 5:
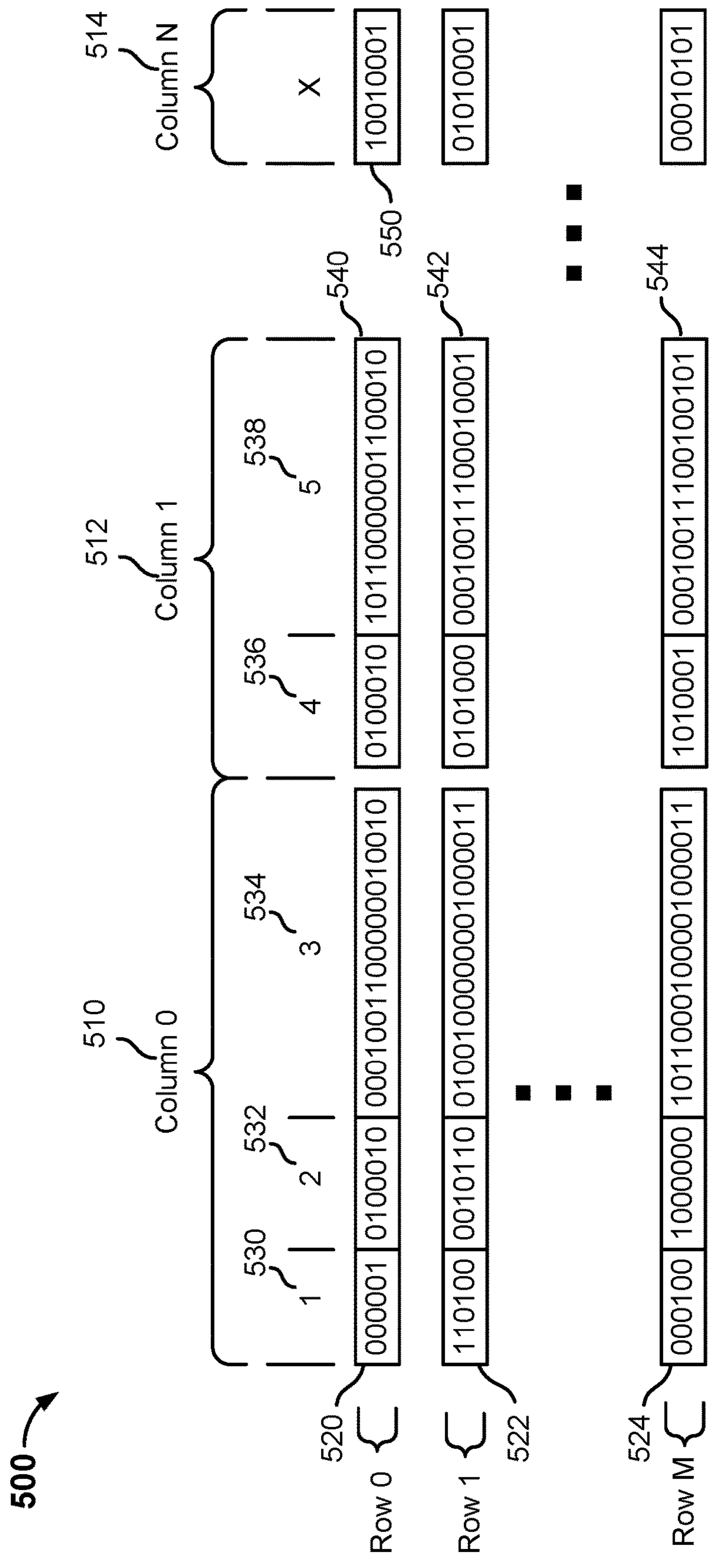
FIG. 5 is a diagram illustrating embodiments of a memory segment.

FIG. 5 is a diagram illustrating embodiments of a memory segment. In the example shown, a memory segment 500 includes multiple columns. The multiple columns include, for example, a zeroth column 510, a first column 512, and so on up to an Nth column 514. Each of the one or more columns includes rows of vectors. For example, the zeroth column 510 includes a zeroth vector 520, a first vector 522, and so on up to an Mth vector 524. The vectors in the zeroth column 510 include three data storage values. In one example, a first data field includes values indicating a status associated with a user profile (e-status). The first data field is associated with a first field identifier 530. The second data field includes user age values, and the second data field is associated with a second field identifier 532. A third data field includes user income values, and the third data field is associated with a third field identifier 534. The zeroth vector 520 in the zeroth column includes e-status, user age, and user income data storage values associated with a first user profile, the first vector 522 includes data storage values associated with a second user profile, and so on up to the Mth vector 524 including data storage values associated with an Mth user profile. The vectors in the first column 512 include two data storage values. In one example, a fourth data field includes a number of days (k-days) between survey receipt and completion. The fourth data field is associated with a fourth field identifier 536. A fifth data field includes zip code, and the fifth data field is associated with a fifth field identifier 538. A zeroth vector 540 in the first column includes k-days and zip code data storage values associated with the first profile, a first vector 542 in the first column includes data storage values associated with the second profile, and so on up to an Mth vector 544 in the first column including data storage values associated with the Mth profile.

In various embodiments, each of one or more vectors in a row includes data storage values associated with a same user and/or user profile. For example, the zeroth vector 520 in the zeroth column, the zeroth vector 540 in the first column, and so on up to the zeroth vector 550 in the Nth column may include, for example, data associated with a same user profile. In some embodiments, however, the vectors in a row include data storage values associated with different users and/or user profiles.

FIG. 6 is a diagram illustrating embodiments of a memory segment layout map. In various embodiments, segment layout map 600 corresponds to the memory segment 500 of FIG. 5. The segment layout map 600 includes field identifiers 610, column identifiers 620, offset values 630, mask values 640, and/or other information. In the segment layout map 600, each of one or more field identifiers maps to a column, an offset value, a mask, and/or other information usable to locate and/or retrieve data associated with the field identifier.

In some embodiments, a set of data storage values is received and it is determined based on the segment layout map 600 whether the data storage values in the set can be stored in a memory segment corresponding to the segment layout map 600. For example, a set of data storage values may be processed to determine field type, size, and/or other attributes associated with each of the data storage values. A field identifier associated with a data storage value is used to look up a mask value in the segment layout map 600 that corresponds to the field identifier. The size of the data storage value is compared to the mask size and/or other data storage size-indicative information. In the event the size of the data storage value is less than or equal to the mask size, it is determined that the memory segment can accommodate the data storage value. In the event the data storage value is larger than the mask size, it is determined that the memory segment cannot accommodate the data storage value. This technique may be repeated for multiple data storage values in the set to determine whether the memory segment can accommodate the set of data storage values.

According to some embodiments, these techniques are repeated across multiple memory segments to determine whether the data storage values can be stored in any of multiple memory segments. In the event it is determined that a memory segment can accommodate a set of data storage values, the data storage values are stored in the segment and the process may end. In the event it is determined that the set of data storage values will not fit in any available memory segment, a memory segment is selected for expansion using the techniques disclosed herein.

In various embodiments, code 650 is generated to query, retrieve, locate, store, copy, move, and/or otherwise process data in a memory segment. A system (for example, server 106 of FIG. 1) may generate, compile, and/or execute the code 650. Code 650 is generated based on data from a segment layout map 600. The code 650 includes a pointer to a portion of a data segment. The portion of the data segment includes one or more data storage values. In one example, the code 650 receives as input a column identifier, a row identifier, an offset, and/or a mask. The column identifier and row identifier point to a certain vector located at the identified column and row. The offset value defines a bitwise operation to right shift the bits of the vector by the offset value. The right-shift operation is denoted by the symbol ">>" in code 650. For example, an offset value of 10 results in the data in a vector being right-shifted by 10 bits. The mask value is then combined with the right-shifted bits in, for example, an "AND" operation to extract only the bits associated with a sub-column within the column. In some cases, right-shifting the bits in the vector by the offset value may align the least significant bit of the data storage value with the least significant bit of the mask. The mask when combined in an "AND" operation with bits in the vector will extract just the desired data storage values. Code 650 includes one example command used to point to and/or otherwise process data storage values in a memory segment, and other commands and/or approaches may be used.

In some cases, a query 650 is generated by retrieving arguments from the segment layout map 600. For example, a row and field identifier are received from a client. And the received field identifier is used to retrieve a column identifier, offset, mask, and/or other information from the segment layout map 600. This retrieved information and the row identifier are used to generate, compile, and execute the query 650.

By way of example with reference to the memory segment of FIG. 5, a request for the age of a user John Smith is received. It is determined that data for user John Smith is stored in Row 1 of the memory segment 500. It is determined that the data field "user age" is associated with the second field identifier in the segment layout map 600. Using the segment layout map 600, the second field identifier is mapped to a column identifier of Column 0, an offset value 19, and a mask 0×7F. The column identifier, row, offset value, mask, and/or other information are used to generate the following example query:

data[column[2]][1]>>offset[2] & mask[2]

The query is executed to retrieve John Smith's age from the memory segment 500. In the example query, the column identifier argument (column[2]) points to the zeroth column 510 of FIG. 5, and the row argument ([1]) points to the first vector 522 in the zeroth column. Within the first vector 522 in the zeroth column, the offset value argument (offset[2] or 19) right-shifts the values of the vector 522 nineteen (19) positions to the beginning bit of the data storage value indicating John Smith's age. The mask value (mask[2] and/or 0×7F) is applied in an "AND" or other logical operation to extract just the seven (7) bits including the storage value indicating John Smith's age. The storage value indicating John Smith's age may occupy elements 19 to 25 of the vector 522. Combining the mask value with right-shifted bits in an "AND" operation extracts elements 19 to 25 of the vector 522 while removing the data storage value included in elements 26 to 31.

Figure 7:
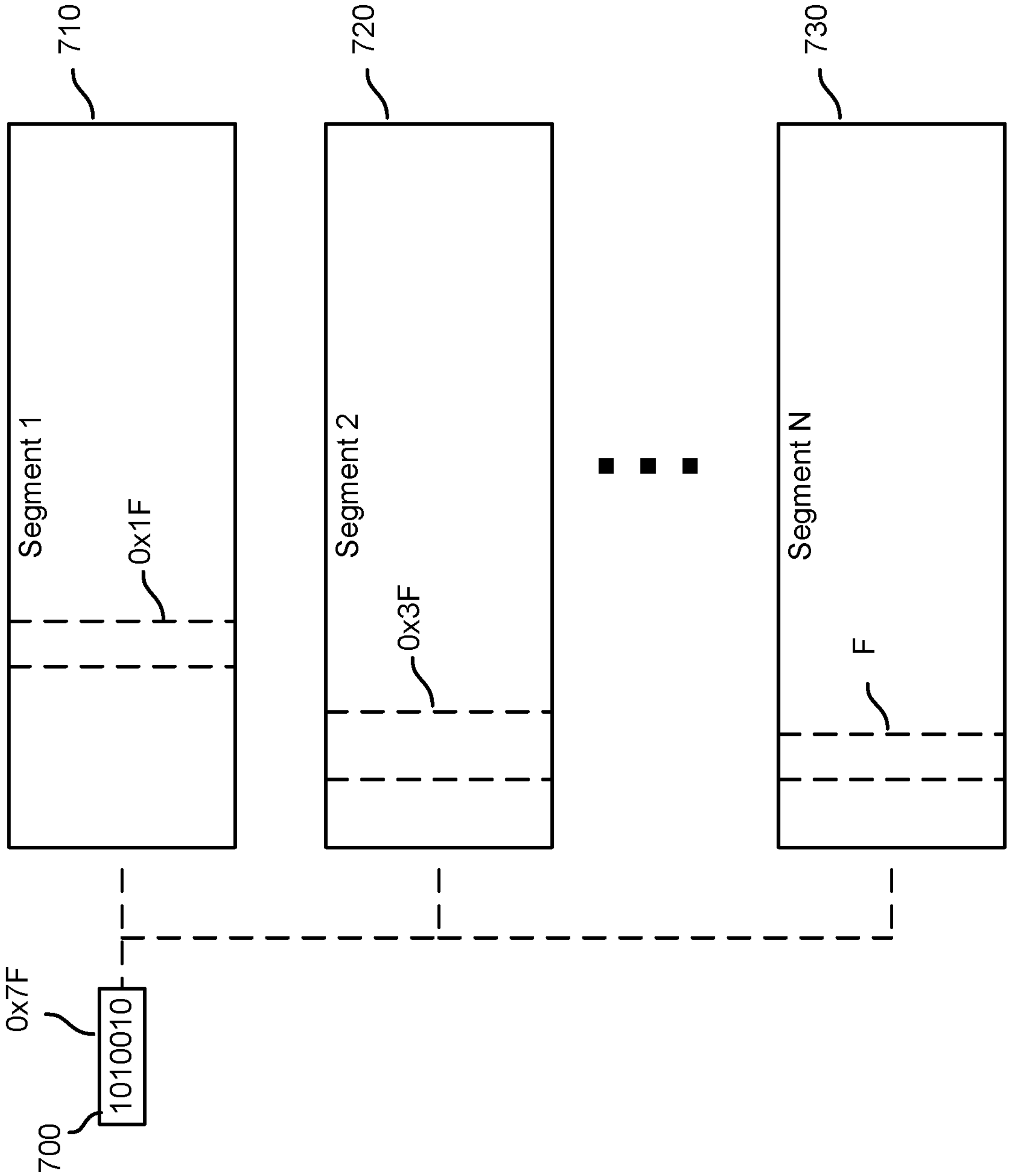
FIG. 7 is a block diagram illustrating embodiments of storing data values.

FIG. 7 is a block diagram illustrating embodiments of storing data values. In various embodiments, a set of data storage values including data storage value 700 is received. It is determined whether the data storage values in the set fit in any available memory segment. The make this determination, the size of a data storage value 700 is compared to a size of an appropriate data field in a memory segment to determine whether the data field can accommodate the data storage value. For example, a size of the data storage value 700 in bits may be compared to a mask size of a data field and/or sub-column. This process may be repeated for multiple memory segments. In various embodiments, it is determined that a data storage value 700 in a set will not fit in any available memory segment. In the example shown, the data storage value 700 includes a number of days since a last login value equal to 82 days or $1010010_2$. The data storage value 700 corresponds to a "last login" data field. The data storage value 700 includes seven (7) bits. Stated another way, it may require seven (7) bits to store the data storage value 700. In some cases, a mask size of 0×7F or $1111111_2$ would be required to accommodate the data storage value 700. The seven (7) bit storage size and/or 0×7F mask size required to store the data storage value 700 is to be compared to data sizes associated with "last login" data fields in multiple segments. The multiple segments include, for example, a first segment 710, a second segment 720, and so on up to an Nth segment 730. It is determined, for example, that the "last login" field and/or sub-column in the first segment 710 is associated with a mask size 0×1F and/or can accommodate five (5) bits. Similarly, it is determined that a sub-column storing "last login" values in the second segment 720 is associated with a mask size of 0×3F and/or can accommodate six (6) bits. It is determined that a "last login" sub-column of the Nth segment 730 is associated with a mask size of 0×F and/or can accommodate four (4) bits. In this case, none of the available memory segments can accommodate the data storage value 700, and one of the segments is selected for expansion. In some embodiments, a memory segment that would require a least expansion is selected. For example, a memory segment is selected that would result in the least column width expansion to accommodate the data storage value 700. In this case, the second memory segment 720 would require the least column width expansion to store the data storage value 700. The "last login" sub-column of the second memory segment 720 would need to be expanded by one (1) bit from six (6) bits to seven (7) bits to accommodate the data storage value 700, while the other segments would require greater column width expansion. The second memory segment 720 is therefore selected for column width expansion.

Figure 8:
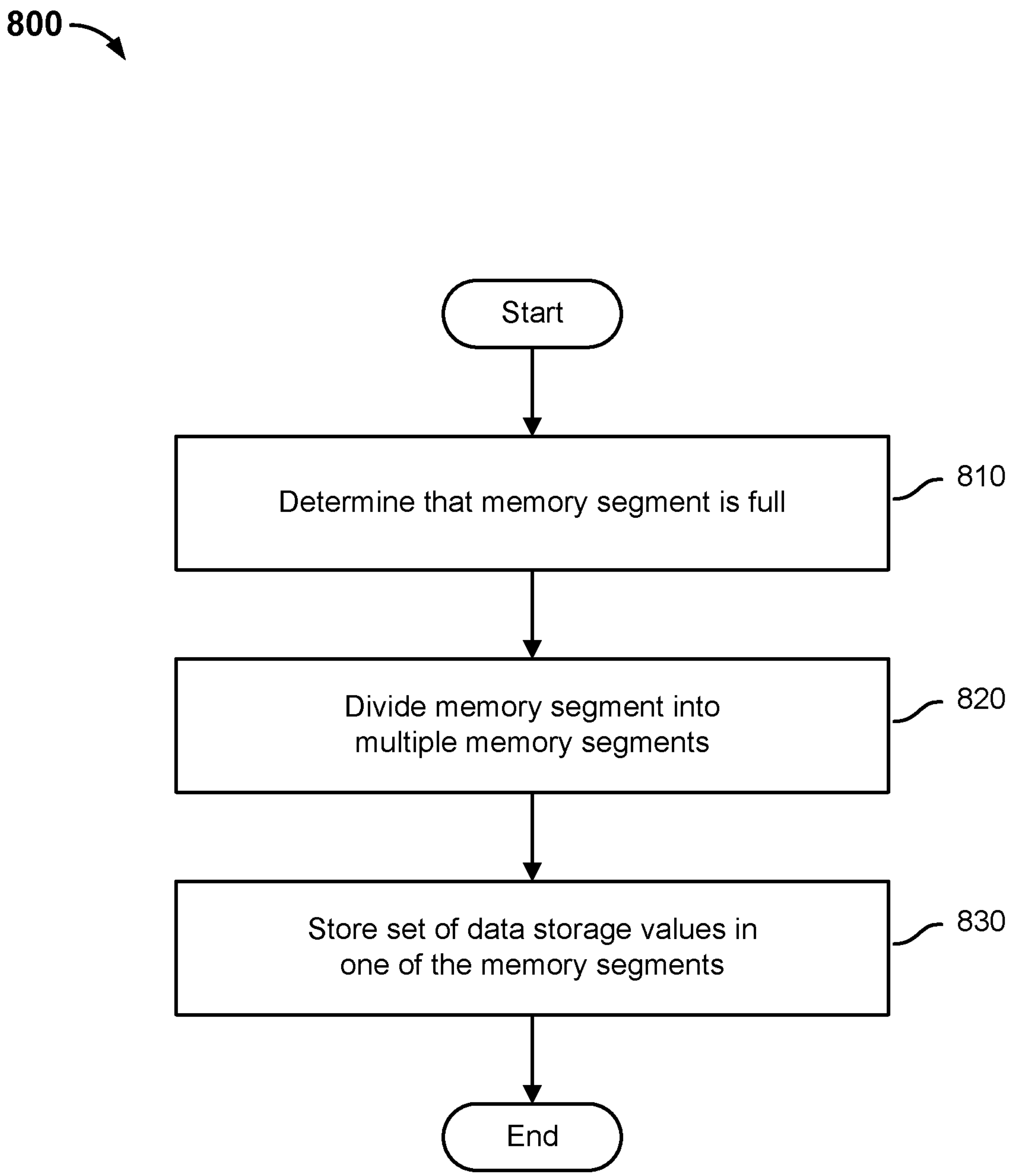
FIG. 8 is a flowchart illustrating embodiments of a process to split memory segments.

FIG. 8 is a flowchart illustrating embodiments of a process to split memory segments. In various embodiments, the process 800 is performed at server 106 of FIG. 1. At 810, it is determined that a memory segment is full. In various embodiments, a memory segment is full if an amount of data stored in the segment meets and/or exceeds a maximum storage capacity of the segment. For example, a memory segment may be able to store up to 65,000 rows of data and/or a certain number of columns each including a maximum bit capacity. In the event that a segment includes 65,000 rows, it is determined that the memory segment is full.

In various embodiments, a memory segment selected for storage of a set of data storage values is determined to be full. In one example, it is determined that a memory segment can store a set of data storage values without column-width expansion. It may, however, be determined that the selected memory segment is full because it includes 65,000 rows of vectors. In another example, a memory segment is selected for column-width expansion using the techniques disclosed herein. And it is determined that the selected memory segment is full.

In some embodiments, it is determined that storing a set of data storage values in a memory segment would result in the segment being full. For example, it is determined that a memory segment could accommodate one additional row of data, but the addition of a set of data storage values to the memory segment would cause the memory segment to be full.

At 820, the memory segment is divided into one or more memory segments. In various embodiments, the memory segment is divided into multiple segments using a clustering algorithm, genetic algorithm, random selection, and/or any other approach. In one example, the memory segment is divided into multiple child memory segments so that each of the child memory segments includes data values of similar size. For example, a first child memory segment may include larger data values while a second child memory segment includes smaller data storage values. Grouping larger data values in one memory segment and smaller data values in another memory segment may increase the speed and/or efficiency of the memory as a whole.

At 830, a set of data storage values is stored in one of the memory segments. In various embodiments, a set of data storage values is stored in a memory segment generated in the dividing process. In one example, a parent memory segment is split into two child memory segments including a first child segment and a second child segment. A set of received data storage values includes three data values each associated with a field identifier. The parent memory segment is divided such that the first child segment includes larger data values in one or more data fields corresponding to the three field identifiers, and the second child segment includes smaller data values in the data fields. In the event the data storage values in the received set are closer in size to those of the first child segment, the set is stored in the first child segment. In the event the data storage values in the received set are closer in size to those of the second child segment, the set is stored in the second child segment.

In some embodiments, a segment is split into multiple child segments and one of the child segments is expanded to accommodate a set of data storage values. For example, columns and/or sub-columns of the selected child memory segment are expanded to accommodate data storage values in the set, and the set may be added to the selected child segment, for example, upon completion of the column and/or sub-column expansion.

In various embodiments, a set of data storage values is added to the memory segment prior to division. For example, it may be determined that adding a set of data storage values to a segment would fill the segment beyond capacity. In this case, the set of data storage values are added to the segment, and the segment split after the data storage values have been added.

Figure 9:
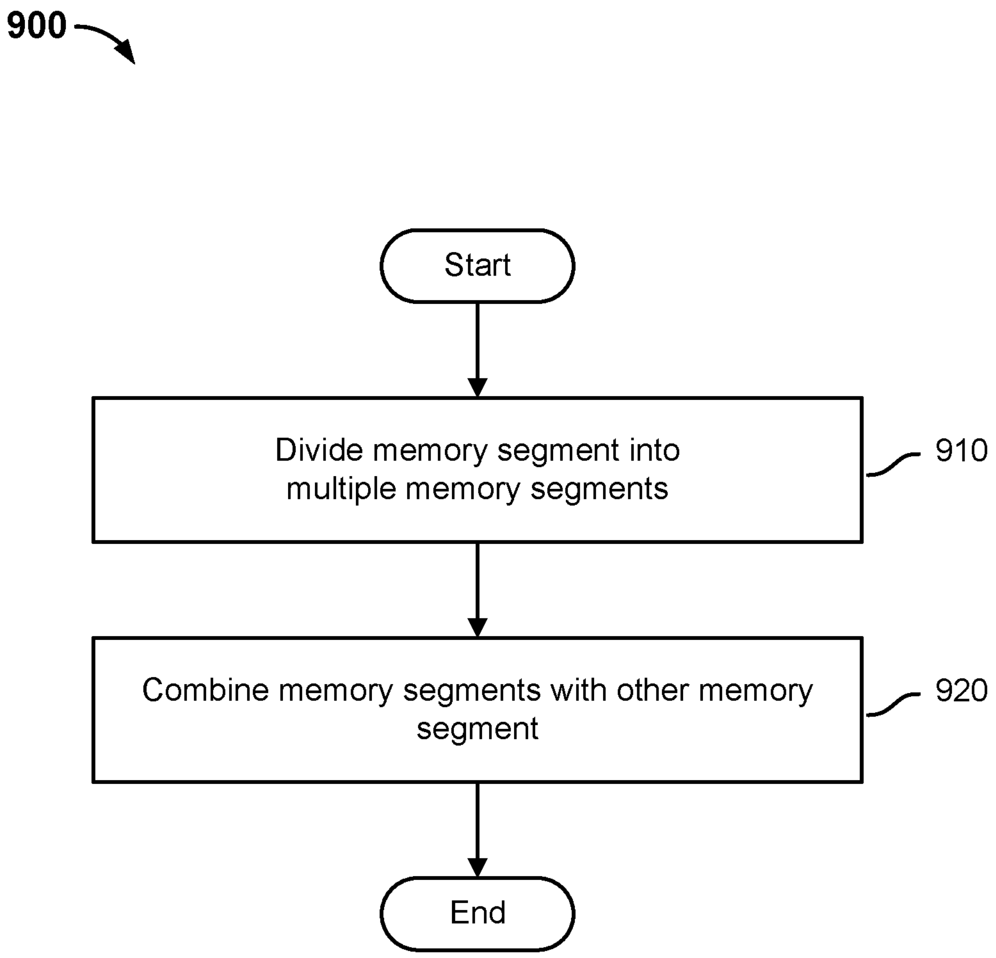
FIG. 9 is a flowchart illustrating embodiments of a process to split and combine memory segments.

FIG. 9 is a flowchart illustrating embodiments of a process to split and combine memory segments. In various embodiments, the process 900 is performed at server 106 of FIG. 1. At 910, a memory segment is divided into one or more memory segments. In some cases, memory segments are divided in response to a trigger event, periodically, at intervals, at predetermined times, at random, on demand, and/or at any other time. In one example, memory segments are divided periodically to optimize data storage allocation across the multiple memory segments included in a memory. In some embodiments, memory segments are divided using a clustering algorithm, genetic algorithm, and/or other approaches to generate memory segments including similarly sized data. As discussed below, a memory segment may be divided into two or more memory segments such that one memory segment includes larger data values for one or more columns and/or sub-columns and another memory segment includes smaller data values for the one or more columns and/or sub-columns. In certain cases, the memory segment including the larger data values includes fewer rows than the memory segment including smaller data values. Dividing the segments in this way balances the data storage used by each of the two segments.

At 920, memory segments are combined with other memory segments. In various embodiments, segments are combined continuously, periodically, at intervals, at predetermined times, at random, in response to a trigger, on demand, and/or at any other time. Segments are combined with other segments to optimize data storage across multiple segments. For example, segments are combined in a background operation to optimize the memory segments by combining segments with similar sized data storage values. In one example, it is determined that two separate segments include data values of similar size. The two segments include user account balance values occupying 16 to 20 bits of storage. And based on this determination, the two segments are combined. In another example, two segments are combined into a synthetic segment and the synthetic segment is divided into two new segments. The synthetic segment is divided into the two new segments such that a first new segment includes larger data values in one or more columns and/or sub-columns and the second new segment includes smaller data values. Using these techniques, memory segments may be continuously optimized to increase the storage density while reducing the storage volume of the memory. In certain cases, segments are randomly combined and split, which may result in a coalescing of data values of similar size. Repeating these steps over a period of time results in a synergistic effect across multiple memory segments.

Figure 10:
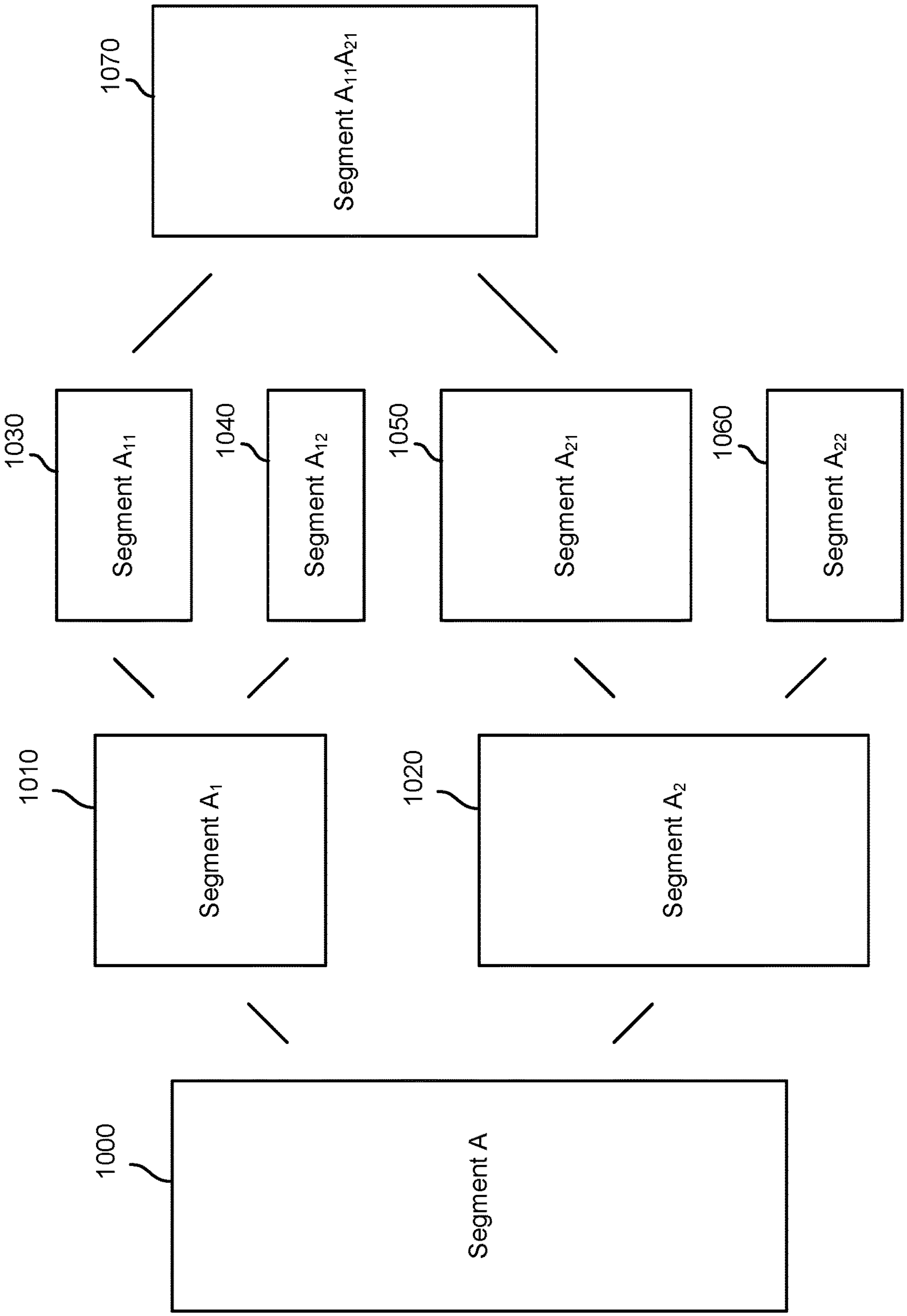
FIG. 10 is a diagram illustrating embodiments of splitting and combining memory segments.

FIG. 10 is a diagram illustrating embodiments of splitting and combining memory segments. In various embodiments, segments are split and combined using genetic algorithms, clustering approaches, heuristic approaches, random division, and/or any other approach. In the example shown, Segment A 1000 is divided into two memory segments. The two memory segments include Segment $A_1$ 1010 and Segment $A_2$ 1020. In one example, Segment A 1000 is divided so that Segment $A_1$ 1010 includes a smaller number of rows of generally larger data values and Segment $A_2$ 1020 includes a larger number of rows of smaller data values. Dividing Segment A 1000 in this manner optimizes the total required storage across Segment $A_1$ 1010 and Segment $A_2$ 1020. In various embodiments, the segment dividing process is repeated. For example, Segment $A_1$ 1010 is divided into Segment $A_{11}$ 1030 and Segment $A_{12}$ 1040, and Segment $A_2$ 1020 is divided into Segment $A_{21}$ 1050 and Segment $A_{22}$ 1060 using similar techniques.

In some embodiments, segments are combined and split. In one example, Segment $A_{11}$ 1030 and Segment $A_{21}$ 1050 are selected for combination, and the two segments are combined to generate Segment $A_{11}A_{21}$ 1070. In certain cases, Segment $A_{11}A_{21}$ 1070 is subsequently divided into multiple segments. This process may be repeated continuously, in the background, and/or in another manner. The goals of the dividing and combining operations are to ensure that data is spread evenly across multiple memory segments, to coalesce large data values together in one or more memory segments, to coalesce small data values together in one or more memory segments, and/or to achieve other objectives. And the approaches used to optimally split and/or combine segments may be generated to achieve these goals.

FIG. 11A is a table illustrating embodiments of splitting memory segments. In the example shown, a table 1100 includes a representation of data storage values included in a memory segment. The table 1100 represents a memory segment including five rows of data storage values and associated mask sizes for three different data fields. The data values and mask sizes are listed in decimal (base-10) for ease of explanation; however, these values may be stored in binary, hexadecimal, and/or another format in an actual memory segment and/or segment layout map. The three different data fields include user zip code or e-zip 1110, user status or e-status 1120, and/or days since receipt of survey or k-days 1130.

In various embodiments, a clustering, heuristic, and/or other dividing approach is used to split the segment represented in the table 1100 into two or more data segments. For example, the segment may be divided such that the memory allocated to store the data values across the two divided memory segments is less than the memory allocation of the original segment prior to division. In the segment represented in table 1100, six (6) bits are allocated to each row of e-zip 1110 data storage values. Six (6) bits are allocated to each row because the e-zip value in row five (5), the maximum e-zip value, requires a mask size of six (6). As a result, a total of 30 bits (five (5) rows of six (6) bits) are required to store the e-zip data 1110. This is inefficient because the full six (6) bits are only required to store one value—the value 50 in row five—while the other values could be stored using fewer bits. Similarly, four (4) bits are allocated to each row of e-status 1120 data storage values. As such, a total of 20 bits are required to store the e-status 1120 data. And 11 bits are allocated to each row of k-days data storage values 1130. As a result, a total of 55 bits are required to store the k-days data 1130. This is sub-optimal because 11 bits are only required to store one value—the 1000 value in the first row—while the other four (4) k-days 1130 data values could be stored using two (2) bits. In aggregate, 105 bits are used to store the values in the memory segment. The total bits used may be reduced by dividing the segment into multiple segments.

FIG. 11B is a table illustrating embodiments of splitting memory segments. In various embodiments, a segment is split by selecting a first set of rows for inclusion in a first child memory segment, selecting a second set of rows for inclusion in a second child memory segment, and so on up to an Nth set of rows for inclusion in an Nth child memory segment. In the example shown, table 1150 and table 1160 include representations of two memory segments generated by dividing the memory segment represented in table 1100 of FIG. 11A. In this example, the division of rows across the two memory segments is determined using a heuristic approach in which e-zip data storage values 1110 are grouped into a set of larger values (50 and 9) and a set of smaller values (7, 6, and 1). The memory segment represented in table 1100 is then to be divided into two segments such that the larger e-zip values 1152 are included in a memory segment represented by table 1150 and the smaller e-zip values 1162 are included in a memory segment represented by table 1160. The parent memory segment, represented by table 1100, is split into the two memory segments in such a way that each row remains intact after the split.

In some embodiments, memory usage is reduced as a result of a dividing operation. As discussed above, the memory segment pre-division (as represented by table 1100) used 105 bits to store the five (5) rows of data. After division, the total memory allocation across the two child segments is less than that of the parent segment pre-division. For example, in the first child segment represented in table 1150, six (6) bits are allocated to each row of e-zip 1152 data storage values. As a result, a total of 12 bits (two (2) rows of six (6) bits) are required to store the e-zip data 1152. Similarly, a total of four (4) bits are required to store the e-status data 1154, and a total of 22 bits are required to store the k-days data 1156. In sum, 38 bits are used to store the data values in the first child memory segment represented in table 1150. In the second child segment represented in table 1160, a total of nine (9) bits (three (3) rows of three (3) bits) are required to store the e-zip data 1162, a total of 12 bits are required to store the e-status data 1164, and a total of six (6) bits are required to store the k-days data 1166. In sum, 27 bits are used to store the data values in the first child memory segment represented in table 1160. In this example, the division of the memory segment represented in table 1100 into two memory segments represented in table 1150 and table 1160 results in a savings of 40 bits (105−(38+27)) and/or a 38% reduction in memory usage.

The examples of FIGS. 11A and 11B use smaller data values for purposes of illustration. However, in some embodiments, data values can be stored only using a fixed number of bits (e.g., 32 or 64 bits). Assuming that the size of a memory word is 32 bits, if an original table needed, for example, 35 bits to be stored, this would be stored using 2×32=64 bits. But if the original table can be split into two tables, each of which requires less than 32 bits, the memory saving would be 50%. Or if the original table can be split into two tables with an equal number of rows, one of which requires the original 35 bits (which would be stored as 2×32=64 bits), and another which requires less than 32 bits, the memory saving would be 25%. It should be noted that the predetermined number of bits that is used to store an integer can be extended from 32 bits or 64 bits to be any number of bits as memory technology improves.

In various embodiments, performing these techniques across multiple memory segments each including, for example, thousands of rows of storage values results in significant reduction of memory usage in a memory system. And this reduction leads to significant memory performance improvement, significant cost reduction, and/or other benefits.

Figure 12:
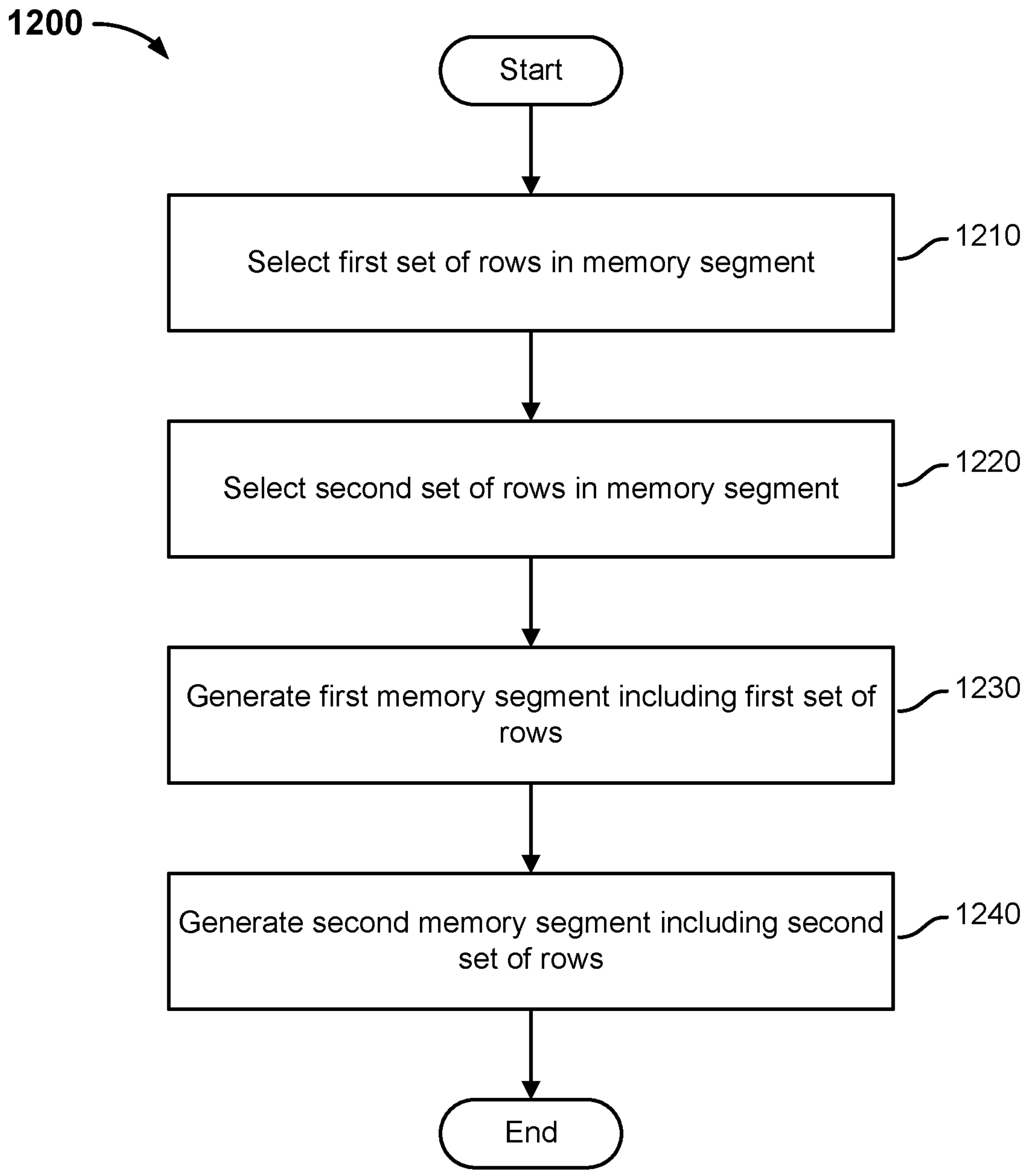
FIG. 12 is a flowchart illustrating embodiments of a process of splitting a memory segment into multiple memory segments.

FIG. 12 is a flowchart illustrating embodiments of a process of splitting a memory segment into multiple memory segments. In various embodiments, the process 1200 is performed at server 106 of FIG. 1. At 1210, a first set of rows in a memory segment is selected. In various embodiments, it is determined that a memory segment is to be divided, for example, based on a trigger event, a determination that the segment is full, as part of a memory optimization process, and/or another event. Upon, for example, a determination that the memory segment is to be divided, a first set of rows in the memory segment is selected. The first set of rows may be selected using, for example, a clustering approach, a technique similar to that described in FIGS. 11A and 11B, and/or any other approach.

At 1220, a second set of rows in the memory segment is selected. In various embodiments, the second set of rows is selected using the same techniques used to select the first set of rows. In one example, the first set of rows includes a group of rows including larger data values in one or more data storage fields and/or sub-columns and the second set of rows includes a group of rows including smaller data values.

At 1230, a first memory segment is generated that includes the first set of rows. In various embodiments, a first child memory segment is generated by initializing an empty memory segment and copying a first set of rows into the empty memory segment. The copy command may be generated, compiled, and/or executed as part of the memory segment division process. A segment layout map corresponding to the first memory segment is generated using the techniques disclosed herein.

At 1240, a second memory segment is generated that includes the second set of rows. In some embodiments, the child second memory segment is generated using the same techniques as used to generate the first memory segment.

According to some embodiments, the process 1200 is not limited to dividing a memory segment into two child memory segments. For example, the techniques of process 1200 may be implemented to divide a memory segment into three or more memory segments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

select a column included in a memory segment to store a data storage value, wherein:

the column comprises a sub-column that stores data of a type associated with the data storage value; and a corresponding variable column width of the sub-column is not more than a maximum allowable column width associated with the column;

determine that a data size associated with the corresponding variable column width of the sub-column is less than a size associated with the data storage value;

determine that the data size associated with the corresponding variable column width of the sub-column can be increased to accommodate the size associated with the data storage value without causing a column width of the column to exceed the maximum allowable column width associated with the column;

increase the data size associated with the corresponding variable column width of the sub-column to accommodate the size associated with the data storage value; and store the data storage value in the sub-column; and a memory coupled to the processor and configured to provide the processor with instructions.

2. The system of claim 1, wherein the data size associated with the corresponding variable column width of the sub-column comprises a mask size associated with the corresponding variable column width of the sub-column.

3. The system of claim 1, wherein the column comprises a plurality of rows each comprising vectors of data storage values.

4. The system of claim 1, wherein to store the data storage value in the sub-column comprises to add to the memory segment, a row comprising the data storage value.

5. The system of claim 1, wherein the processor is further configured to update a segment layout map including by updating one or more of column identifiers, offset values, and mask values based at least in part on the increased data size associated with the corresponding variable column width of the sub-column.

6. The system of claim 1, wherein the processor is further configured to:

determine that the memory segment is full; and divide the memory segment into a plurality of memory segments.

7. The system of claim 6, wherein to store the data storage value includes to store the data storage value in one of the plurality of memory segments.

8. The system of claim 6, wherein to store the data storage value includes to store the data storage value prior to the dividing of the memory segment.

9. The system of claim 1, wherein the processor is further configured to divide the memory segment into a plurality of memory segments.

10. The system of claim 9, wherein to divide the memory segment includes to:

determine a first set of rows and a second set of rows included in the memory segment; and divide the memory segment into a plurality of memory segments comprising a first memory segment including the first set of rows and a second memory segment including the second set of rows.

11. The system of claim 9, wherein to divide the memory segment includes to combine a first memory segment divided from the plurality of memory segments with a second memory segment divided from the plurality of memory segments.

12. The system of claim 1, wherein the processor is further configured to:

divide the memory segment into a plurality of memory segments; and combine a first memory segment of the plurality of memory segments with a second memory segment divided from a separate memory segment.

13. The system of claim 1, wherein to store the data storage value comprises to:

determine that storing the data storage value in the memory segment would result in the memory segment filling up;

divide the memory segment into a plurality of memory segments based at least in part on the determination; and store the data storage value in one of the plurality of memory segments.

14. A method, comprising:

selecting a column included in a memory segment to store a data storage value, wherein:

the column comprises a sub-column that stores data of a type associated with the data storage value; and a corresponding variable column width of the sub-column is not more than a maximum allowable column width associated with the column;

determining that a data size associated with the corresponding variable column width of the sub-column is less than a size associated with the data storage value;

determining that the data size associated with the corresponding variable column width of the sub-column can be increased to accommodate the size associated with the data storage value without causing a column width of the column to exceed the maximum allowable column width associated with the column;

increasing the data size associated with the corresponding variable column width of the sub-column to accommodate the size associated with the data storage value; and storing the data storage value in the sub-column.

15. The method of claim 14, further comprising:

determining that the memory segment is full; and dividing the memory segment into a plurality of memory segments.

16. The method of claim 15, wherein storing the data storage value includes storing the data storage value in one of the plurality of memory segments.

17. The method of claim 15, wherein storing the data storage value includes storing the data storage value prior to the dividing of the memory segment.

18. The method of claim 14, further comprising:

dividing the memory segment into a plurality of memory segments; and combining a first memory segment of the plurality of memory segments with a second memory segment divided from a separate memory segment.

19. The method of claim 14, wherein storing the data storage value comprises:

determining that storing the data storage value in the memory segment would result in the memory segment filling up;

dividing the memory segment into a plurality of memory segments based at least in part on the determination; and storing the data storage value in one of the plurality of memory segments.

20. A computer program product, the computer program product being embodied in a tangible non-transitory computer readable storage medium and comprising computer instructions for:

selecting a column included in a memory segment to store a data storage value, wherein:

the column comprises a sub-column that stores data of a type associated with the data storage value; and a corresponding variable column width of the sub-column is not more than a maximum allowable column width associated with the column;

determining that a data size associated with the corresponding variable column width of the sub-column is less than a size associated with the data storage value;

determining that the data size associated with the corresponding variable column width of the sub-column can be increased to accommodate the size associated with the data storage value without causing a column width of the column to exceed the maximum allowable column width associated with the column;

increasing the data size associated with the corresponding variable column width of the sub-column to accommodate the size associated with the data storage value; and storing the data storage value in the sub-column.

* * * * *